United States Patent
Yaxuan et al.

(10) Patent No.: US 8,375,433 B2
(45) Date of Patent: Feb. 12, 2013

(54) METHOD FOR MULTI-CORE PROCESSOR BASED PACKET CLASSIFICATION ON MULTIPLE FIELDS

(75) Inventors: Qi Yaxuan, Beijing (CN); Li Jun, Beijing (CN)

(73) Assignee: Tsinghua University, Beijing (CN)

( * ) Notice: Subject to any disclaimer, the term of this patent is extended or adjusted under 35 U.S.C. 154(b) by 589 days.

(21) Appl. No.: 12/689,842

(22) Filed: Jan. 19, 2010

(65) Prior Publication Data

US 2010/0192215 A1    Jul. 29, 2010

(30) Foreign Application Priority Data

Jan. 19, 2009 (CN) .......................... 2009 1 0077067

(51) Int. Cl.
| | |
|---|---|
| G06F 9/00 | (2006.01) |
| G06F 15/16 | (2006.01) |
| G06F 17/00 | (2006.01) |
| G06F 15/173 | (2006.01) |
| G06N 5/02 | (2006.01) |
| H04L 29/06 | (2006.01) |

(52) U.S. Cl. ............. 726/11; 706/47; 709/238; 713/154
(58) Field of Classification Search .................... 726/11, 726/13
See application file for complete search history.

(56) References Cited

U.S. PATENT DOCUMENTS

| | | | |
|---|---|---|---|
| 6,560,610 B1 * | 5/2003 | Eatherton et al. ...................... 1/1 |
| 6,970,462 B1 * | 11/2005 | McRae ........................ 370/392 |
| 7,116,663 B2 * | 10/2006 | Liao .............................. 370/392 |
| 7,197,244 B2 * | 3/2007 | Thomas et al. ................... 398/72 |
| 7,394,836 B2 * | 7/2008 | Ko et al. ........................ 370/537 |
| 7,403,999 B2 * | 7/2008 | Corl et al. ...................... 709/230 |
| 7,412,431 B2 * | 8/2008 | Corl et al. ........................ 706/47 |
| 7,474,654 B2 * | 1/2009 | Guru ............................. 370/389 |
| 7,624,436 B2 * | 11/2009 | Balakrishnan et al. .......... 726/13 |
| 7,742,480 B2 * | 6/2010 | Calvignac et al. ............. 370/392 |
| 7,784,094 B2 * | 8/2010 | Balakrishnan et al. .......... 726/13 |
| 7,787,463 B2 * | 8/2010 | Baden ........................... 370/392 |
| 7,813,263 B2 * | 10/2010 | Chang et al. .................. 370/216 |
| 7,826,486 B2 * | 11/2010 | Calvignac et al. ............. 370/476 |
| 7,870,278 B2 * | 1/2011 | Corl et al. ..................... 709/230 |
| 7,941,390 B2 * | 5/2011 | Corl et al. ........................ 706/47 |
| 8,045,563 B2 * | 10/2011 | Lee ........................... 370/395.41 |
| 8,171,539 B2 * | 5/2012 | Miranda ......................... 726/13 |
| 8,223,641 B2 * | 7/2012 | Lee et al. ....................... 370/234 |
| 2003/0086140 A1 * | 5/2003 | Thomas et al. ................ 359/167 |
| 2003/0108043 A1 * | 6/2003 | Liao .............................. 370/392 |

(Continued)

OTHER PUBLICATIONS

Pankaj Gupta and Nick McKeown; Packet Classification on Multiple Fields; ; Oct. 1999; 14 pgs.; Computer Systems Laboratory, Stanford University; Stanford, CA.

(Continued)

*Primary Examiner* — Carolyn B Kosowski
(74) *Attorney, Agent, or Firm* — Crain Caton & James

(57) ABSTRACT

The present invention relates to a method for multi-core processor based packet classification on multiple fields. The invention specifically proposes three methods to select partition points, two associated methods to select dimensions, then receiving packet information after the data structure of classification is constructed, and searching the data structure of classification according to packet information to get matched results. The present invention can be implemented on many types of multi-core processor based platforms which ensure favorable performance and adaptive capabilities for different network applications, and significantly reduce the product cost of high-end routers and firewalls.

9 Claims, 5 Drawing Sheets

U.S. PATENT DOCUMENTS

| | | | |
|---|---|---|---|
| 2003/0123459 A1* | 7/2003 | Liao | 370/401 |
| 2003/0126272 A1* | 7/2003 | Corl et al. | 709/230 |
| 2004/0010612 A1* | 1/2004 | Pandya | 709/230 |
| 2004/0032872 A1* | 2/2004 | Dhara | 370/401 |
| 2004/0114602 A1* | 6/2004 | Ko et al. | 370/395.4 |
| 2005/0089016 A1* | 4/2005 | Zhang et al. | 370/351 |
| 2005/0135378 A1* | 6/2005 | Rabie et al. | 370/395.21 |
| 2005/0237938 A1* | 10/2005 | Corl et al. | 370/235 |
| 2005/0237939 A1* | 10/2005 | Corl et al. | 370/235 |
| 2006/0002292 A1* | 1/2006 | Chang et al. | 370/225 |
| 2006/0164980 A1* | 7/2006 | Guru | 370/229 |
| 2006/0203808 A1* | 9/2006 | Zhang et al. | 370/352 |
| 2007/0006293 A1* | 1/2007 | Balakrishnan et al. | 726/13 |
| 2007/0011734 A1* | 1/2007 | Balakrishnan et al. | 726/13 |
| 2007/0171838 A1* | 7/2007 | Baden | 370/252 |
| 2008/0117918 A1* | 5/2008 | Kobayashi | 370/400 |
| 2008/0205405 A1* | 8/2008 | Corl et al. | 370/392 |
| 2008/0249973 A1* | 10/2008 | Corl et al. | 706/47 |
| 2008/0253398 A1* | 10/2008 | Calvignac et al. | 370/474 |
| 2009/0168790 A1* | 7/2009 | Lee | 370/412 |
| 2010/0020686 A1* | 1/2010 | Lee et al. | 370/231 |
| 2010/0088756 A1* | 4/2010 | Balakrishnan et al. | 726/13 |
| 2010/0175124 A1* | 7/2010 | Miranda | 726/13 |
| 2010/0192215 A1* | 7/2010 | Yaxuan et al. | 726/11 |
| 2012/0008636 A1* | 1/2012 | Lee | 370/412 |
| 2012/0213070 A1* | 8/2012 | Lee et al. | 370/231 |

OTHER PUBLICATIONS

Pankaj Gupta and Nick McKeown; Packet Classification Using Hierarchial Intelligent Cuttings; Aug. 18, 1999; 9 pgs.; Computer Systems Laboratory, Stanford University; Stanford, CA.

* cited by examiner

METHOD FOR MULTI-CORE PROCESSOR BASED PACKET CLASSIFICATION ON MULTIPLE FIELDS

CROSS-REFERENCE TO RELATED APPLICATIONS

The priority of Chinese Patent Application No. 200910077067.4, filed on Jan. 19, 2009, is hereby claimed, and the specification thereof is incorporated herein by reference.

STATEMENT REGARDING FEDERALLY SPONSORED RESEARCH

Not applicable.

FIELD OF THE INVENTION

The present invention relates to Internet filtering and monitoring technology, and more specifically, to a method for multi-core processor based packet classification on multiple fields.

BACKGROUND OF THE INVENTION

Packet classification is a key part and core technology of firewall and security gateway systems. Packets are filtered by inspecting and handling the packet header in OSI (Open System Interconnection) network protocol layers 2 to 4in the packet classification. The most common application is the 5-tuple filter, that is, the source/destination network layer address (32-bit each for IPv4), source/destination transport layer port (16-bit each) and transport layer protocol flag (8 bits).

Now, specialized hardware solutions like ASIC/FPGA are used to solve performance bottlenecks in packet classification in the above gigabit firewall and security gateway devices; however, due to the disadvantages of a long time-to-market, large silicon area, high power consumption, and difficult upgrades high-performance packet classification are not yet widely implemented on none-hardware network devices. To this end, a series of packet classification methods based on a general-purpose processor (CPU) have been extensively researched and developed. American academic institutions such as Stanford University, University of California San Diego, and Washington University, as well as companies such as Cisco, IBM have made a number of studies and experiments in this regard. They have set forth an array of solutions to solve the packet classification issue, which can be divided into two main categories based on general-purpose processors: a packet classification method using decision tree structures, such as *HiCuts*, P. Gupta and N. McKeown, "*Packet Classification Using Hierarchical Intelligent Cuttings,*" *Proc. Hot Interconnects*, 1999, and a packet classification method using hierarchical list structures, such as *RFC*, P. Gupta and N. McKeown, "*Packet Classification On Multiple Fields,*" *Proc. ACM SIGCOMM* 99, 1999. These two categories of methods eliminate redundant search space and increase the speed of packet classification through a variety of heuristic algorithms by exploiting different aspects of the structural characteristics of classifier rule sets.

FIG. 1 shows a flow chart of packet classification using the prior decision tree structure. This method includes the following steps: the management unit performs pre-process, that is the construction of the classifier data structure (also known as a decision tree) according to the structural characteristics of the classifier rule set, and the output of the constructed classifier data structure to the classifier unit; the classifier unit receives the input packet and obtains 5-tuple information of the packets, then classifies the packets according to the classification data structure, and locates the node matched by the packets to get the classification results; the forwarding unit handles packets according to the classification results to achieve the storage, forwarding, abandonment, or recording of packets and so on.

However, since the design of the existing methods is developed from the rules' characteristics without consideration of memory hierarchy and processor architecture, the classifier data structure in the prior structure is relatively redundant, and thus cannot work effectively for multi-core processors.

SUMMARY OF THE INVENTION

The objectives of the present invention are to provide a multi-core processor based packet classification on multiple fields, which can be implemented on many types of platforms, ensure favorable performance and adaptive capability to different network applications, and significantly reduce the cost of high-end routers and firewalls.

To achieve the above objectives, the following technical solution is adopted in the present invention.

In one embodiment, the present invention includes A method for multi-core processor based packet classification on multiple fields comprising the following steps:

a) obtaining an overall rule set (R0), in which each rule includes a priority, a range value of each filtering field, and classification results;

b) defining an initial search space (S0), which contains all possible values of each filtering field in a packet header in which each filtering field corresponds to a dimension of the initial search space;

c) generating a root node (V0) corresponding to R0, S0, and a group of processing elements (R', S' and V');

d) copying R0, S0 and V0 to R', S' and V' respectively;

e) enqueueing the group of processing elements (R', S' and V') into a first in first out queue (Q);

f) dequeueing another group of processing elements (R, S and V) from the queue Q;

g) determining if each rule in R includes S;

h) selecting a field (F) as a partition field for S, along which there are a maximum number of different endpoint values, if each rule in R does not include S;

i) sorting the different endpoint values of all rules in R along the partition field F in ascending order, assuming there are M endpoint values in total;

j) selecting an endpoint numbered INT(M/2) along F as a partition point P, where INT(M/2) is a rounding operation;

k) partitioning S into a first subspace (S1) and a second subspace (S2) through the partition point P on F;

l) labeling all rules in the rule set R which overlap with the subspace S1 as a rule set (R1);

m) labeling all rules in the rule set R which overlap with the subspace S2 as a rule set (R2);

n) generating two sub-nodes (V1 and V2);

o) storing the sub-nodes V1 and V2 in a continuous memory space;

p) associating V1 with R1 and S1;

q) associating V2 with R2 and S2;

r) setting an internal node (V);

s) assigning the following data structure to V:
V.field=F, V.point=P, V.offset=starting address of V1;

t) generating another group of processing elements (R', S' and V');

u) copying R1, S1 and V1 to R', S' and V';
v) enqueueing the another group into the queue Q;
w) generating another group of processing elements (R', S' and V');
x) copying R2, S2 and V2 to R', S' and V';
y) enqueueing the another group into the queue Q, and then returning to step (f);
z) repeating steps (f)-(y) until each rule in R includes S;
aa) obtaining a rule (r) with the highest priority in R;
ab) defining a leaf node (V);
ac) assigning the following data structure to V:
V.field=r.action, V.point=r.pri, V.offset=0;
Where r.action is the classification result of the rule r and r.pri is the priority of rule r;
ad) determining if the queue Q is empty;
ae) repeating steps (f), (g), and (z) until the queue Q is empty;
af) returning the root node V0 if the queue Q is empty, which is a starting node used to map a decision tree data structure;
ag) receiving a network packet;
ah) mapping the decision tree from the root node V0 until a leaf node is reached, according to the values of the filtering fields; and
ai) classifying the network packet according to V.field stored in the leaf node.

In another embodiment, the present invention includes a method for multi-core processor based packet classification on multiple fields comprising the following steps:
a) obtaining an overall rule set (R0), in which each rule includes a priority, a range value of each filtering field, and classification results;
b) defining an initial search space (S0), which contains all possible values of each filtering field in a packet header, in which each filtering field corresponds to a dimension of the initial search space:
c) generating a root node (V0) corresponding to R0, S0, and a group of processing elements (R', S' and V');
d) copying R0, S0 and V0 to R', S' and V' respectively;
e) enqueueing the group of processing elements (R', S' and V') into a first in first out queue (Q);
f) dequeueing another group of processing elements (R, S and V) from the queue Q;
g) determining if each rule in R includes S;
h) selecting a field (F) as a partition field for S, along which there a maximum number of different endpoint values;
i) sorting the different endpoint values of all rules in R along the partition field F in ascending order, assuming there are M endpoint values in total;
j) selecting an endpoint (P) from M endpoints as a partition point, such that after partitioning S through point P on field F, the number of rules that fall into a sub-space is closest to half of the number of all rules in R;
k) partitioning S into a first subspace (S1) and a second subspace (S2) through the partition point P on F;
l) labeling all rules in the rule set R which overlap with the subspace S1 as a rule set (R1);
m) labeling all rules in the rule set R which overlap with the subspace S2 as a rule set (R2);
n) generating two sub-nodes (V1 and V2);
o) storing the sub-nodes V1 and V2 in a continuous memory space;
p) associating V1 with R1 and S1;
q) associating V2 with R2 and S2;
r) setting an internal node (V);
s) assigning the following data structure to V:
V.field=F, V.point=P, V.offset=starting address of V1;
t) generating another group of processing elements (R', S' and V');
u) copying R1, S1 and V1 to R', S' and V';
v) enqueueing the another group into the queue Q;
w) generating another group of processing elements (R', S' and V');
x) copying R2, S2 and V2 to R', S' and V';
y) enqueueing the another group into the queue Q, and then returning to step (f);
z) repeating steps (f)-(y) until each rule in R includes S;
aa) obtaining a rule (r) with the highest priority in R;
ab) defining a leaf node (V);
ac) assigning the following data structure to V:
V.field=r.action, V.point=r.pri, V.offset=0;
Where r.action is the classification result of the rule r and r.pri is the priority of rule r;
ad) determining if the queue Q is empty;
ae) repeating steps (f), (g), and (z) until the queue Q is empty;
af) returning the root node V0 if the queue Q is empty, which is a starting node used to map a decision tree data structure;
ag) receiving a network packet;
ah) mapping the decision tree from the root node V0 until a leaf node is reached, according to the values of the filtering fields; and
ai) classifying the network packet according to V.field stored in the leaf node.

In yet another embodiment, the present invention includes a method for multi-core processor based packet classification on multiple fields comprising the following steps:
a) obtaining an overall rule set (R0), in which each rule includes a priority, a range value of each filtering field, and classification results;
b) defining an initial search space (S0), which contains all possible values of each filtering field in a packet header, in which each filtering field corresponds to a dimension of the initial search space;
c) generating a root node (V0) corresponding to R0, S0, and a group of processing elements (R', S' and V');
d) copying R0, S0 and V0 to R', S' and V' respectively;
e) enqueueing the group of processing elements (R', S' and V') into a first in first out queue (Q);
f) dequeueing another group of processing elements (R, S and V) from the queue Q;
g) determining if each rule in R includes S;
h) counting the number of rules in R that fall into each interval for all fields, where every two adjacent endpoint values on each field of R form an interval;
i) computing an average number of rules per interval for each field;
j) selecting a field (F) with a minimum average number of rules per interval as a partition field for S?;
k) selecting an endpoint (P) on the field F as a partition point, such that a sum of rules falling into an interval between a first endpoint and P on F is a minimum number, where the minimum number is larger than half of the sum of rules falling into each interval;
l) partitioning S into a first subspace (S1) and a second subspace (S2) through the partition point P on F;
m) labeling all rules in the rule set R which overlap with the subspace S1 as a rule set (R1);
n) labeling all rules in the rule set R which overlap with the subspace S2 as a rule set (R2);
o) generating two sub-nodes (V1 and V2);
p) storing the sub-nodes V1 and V2 in a continuous memory space;

q) associating V1 with R1 and S1;
r) associating V2 with R2 and S2;
s) setting an internal node (V);
t) assigning the following data structure to V:
V.field=F, V.point=P, V.offset=starting address of V1;
u) generating another group of processing elements (R', S' and V');
v) copying R1, S1 and V1 to R', S' and V';
w) enqueueing the another group into queue Q;
x) generating another group of processing elements (R', S' and V');
y) copying R2, S2 and V2 to R', S' and V';
z) enqueueing the another group into queue Q, and then returning to step f;
aa) repeating steps (f)-(z) until each rule in R includes S;
ab) obtaining a rule (r) with the highest priority in R;
ac) defining a leaf node (V);
ad) assigning the following data structure to V:
V.field=r.action, V.point=r.pri, V.offset=0;
Where r.action is the classification result of the rule r, and r.pri is the priority of rule r;
ae) determining if the queue Q is empty;
af) repeating steps (f), (g) and (aa) until the queue Q is empty.
ag) returning the root node V0 if the queue Q is empty, which is a starting node used to map a decision tree data structure;
ah) receiving a network packet;
ai) mapping the decision tree from the root node V0 until a leaf node is reached, according to the values of the filtering fields; and
aj) classifying the network packet according to V.field stored in the leaf node.

The method for multi-core processor based packet classification on multiple fields according to the present invention has the following advantages:

a) It can be implemented on many types of platforms, including CPU-based general-purpose platforms and NPU-based specialized platforms;
b) The method to select the partition field and the partition point ensures favorable performance and adaptive capabilities for different network applications; and
c) It significantly reduces the costs of high-end routers and firewalls, which will accelerate the implementation and deployment of the next generation Internet.

DETAILED DESCRIPTION OF THE PREFERRED EMBODIMENTS

Hereinafter, the method for multi-core processor based packet classification on multiple fields according to the present invention will be described in detail with reference to the accompanying drawings and embodiments.

The proposed method in the present invention adapts to packet classification of any dimension on multiple fields. In order to conveniently describe, the most commonly applied 5-tuple (i.e. source/destination network layer address (32-bit each), source/destination transport layer port (16-bit each) and transport layer protocol flag (8 bits)) is defined as 5 filtering fields, the standard followed by the packet classification according to the present invention is that the number of rules in every sub-space is reduced by partition search space recursively until every subspace has a unique matched rule. Regarding the question of selecting the particular field to partition and the particular point on the selected field to partition, the solution of the proposed method in the present invention is to select a special field such that the total number of rules that fall into two rule sub-sets in two sub-spaces is as small as possible after partitioning the selected field through the selected partition point. The proposed method of selecting partition point on the selected field in the present invention is to select the point on the selected field such that the numbers of rules falling into the two sub-spaces are equal to each other as much as possible after partition through the point.

The innovation points of the present invention in comparison to the prior method are embodied in the method to construct a decision tree data structure used by classification, and the method to partition search space during the construction of a decision tree, specifically, the method to select particular partition points and partition fields. The determination of partition points and partition dimensions are only related to sub-space and sub-sets of rules that fall into the sub-space, and apply one of the three methods to select partition points and one of two methods to select dimensions.

Embodiment 1

Figure 1:
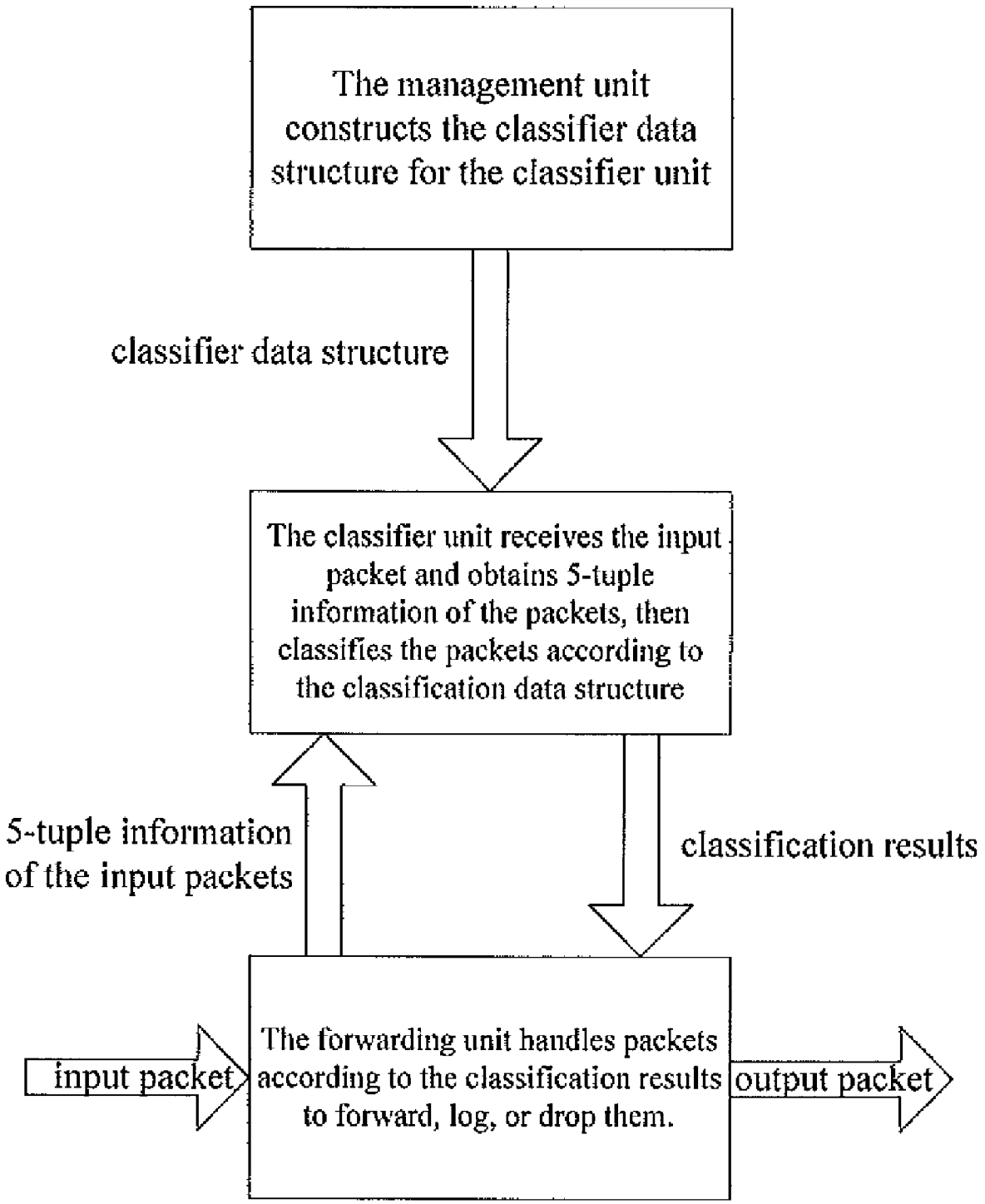
FIG. 1 shows the prior flowchart to classify packets using decision tree structures.
Figure 2:
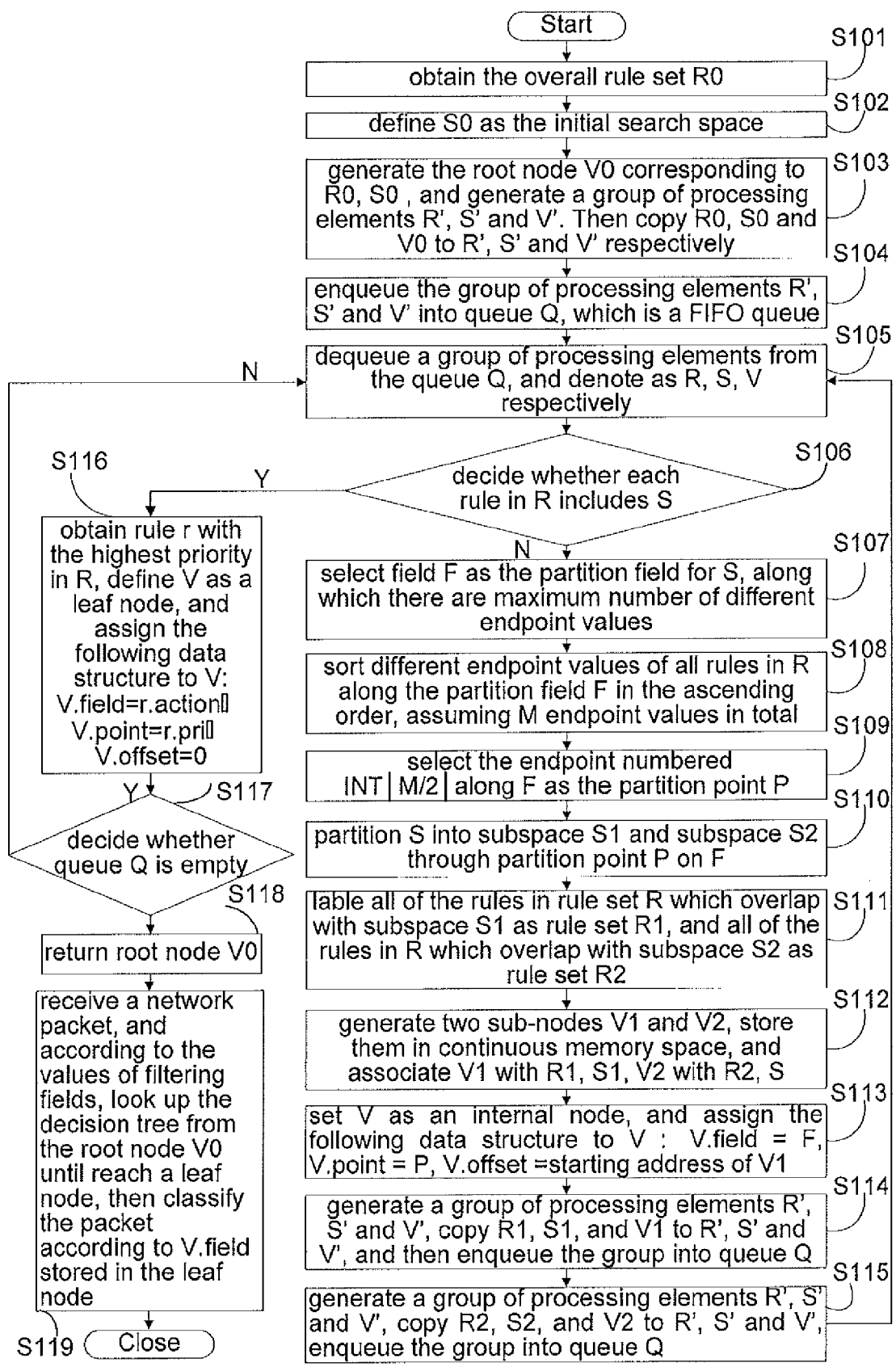
FIG. 2 shows the flowchart of the multi-core processor based packet classification on multiple fields according to the present invention.
Figure 3:
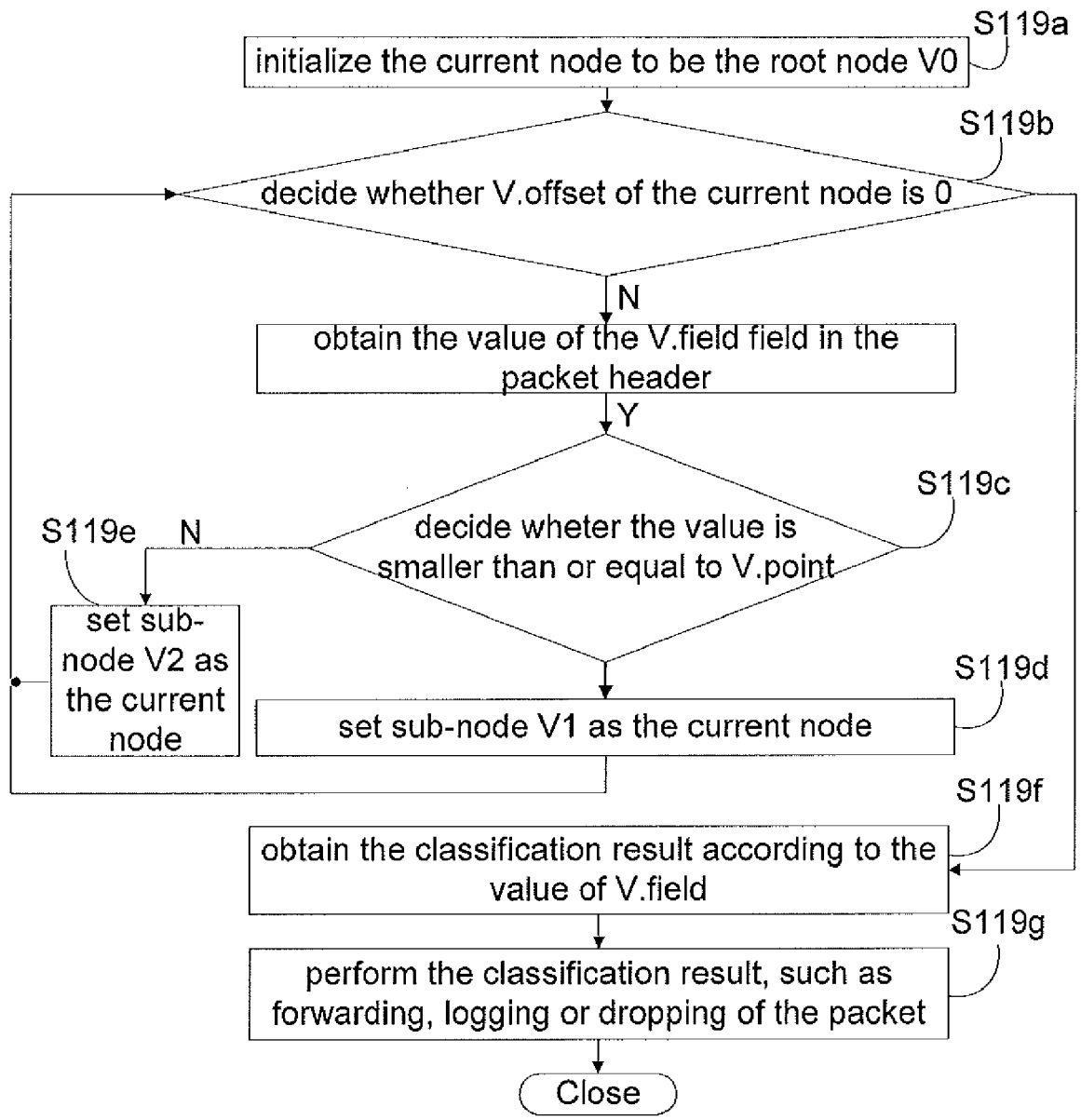
FIG. 3 shows the flowchart of the decision tree-based packet classification according to an embodiment of the present invention.
Figure 4:
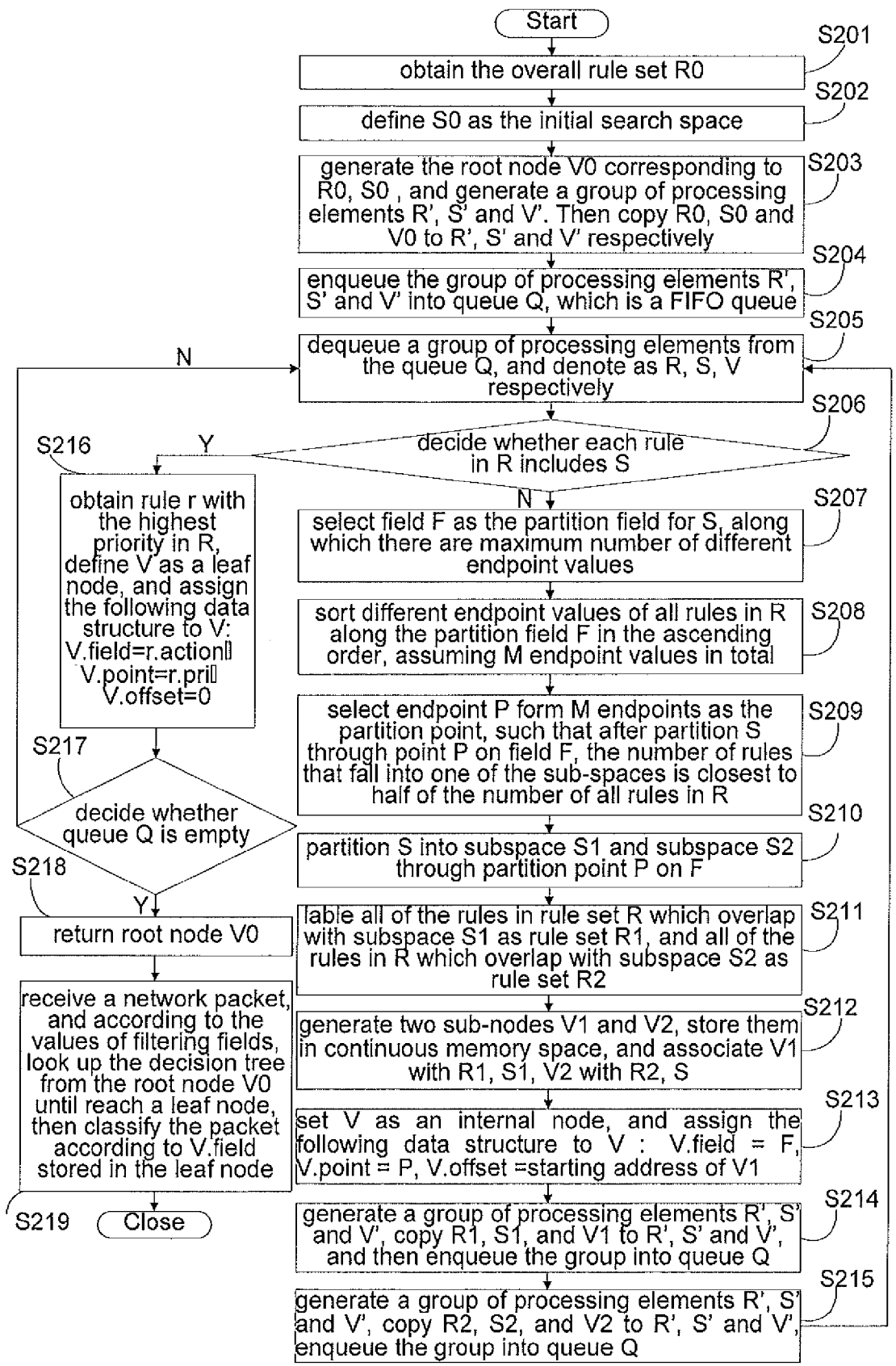
FIG. 4 shows the flowchart of another method for multi-core processor based packet classification on multiple fields according to the present invention.
Figure 5:
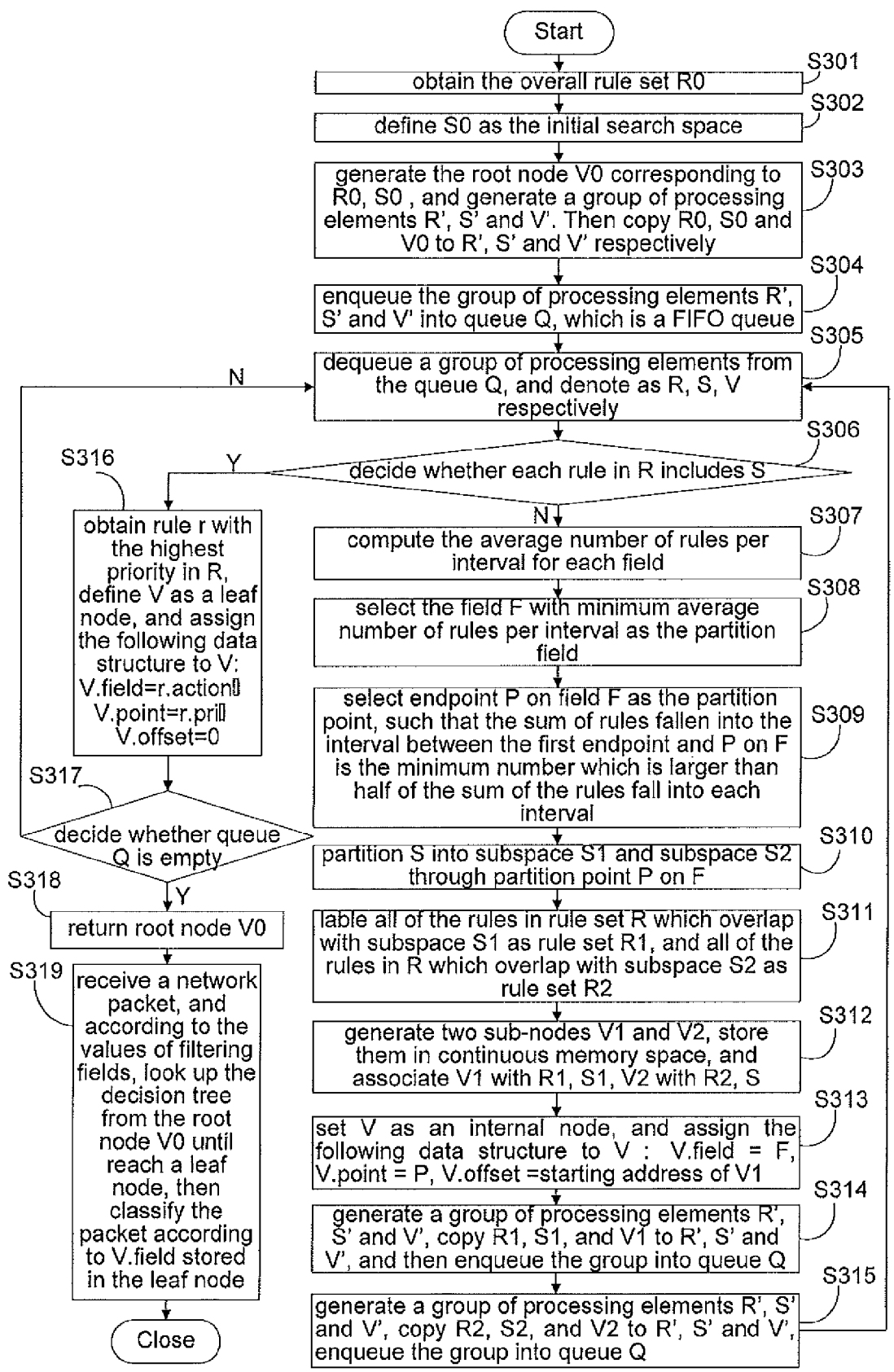
FIG. 5 shows the flowchart of a third method for multi-core processor based packet classification on multiple fields according to the present invention.

FIG. 2 shows the flowchart of the multi-core processor based packet classification on multiple fields according to the present embodiment, including the following steps:

s101, obtain the overall rule set R0, in which each rule includes priority, the range value of each filtering field, and the classification results;

Every rule describes as follows for 5-tuple classification:

```
RULE{
    uint16_t    pri;        // rule priority, 0 is the highest,
    uint32_t    sIP[2];     // range of source IP address
    uint32_t    dIP[2];     // range of destination IP address
    uint16_t    sPT[2];     // range of source port address
    uint16_t    dPT[2];     // range of destination port address
    uint8_t     prot;       // transport layer protocol, such as TCP,UDP
    uint8_t     action;     //packet classification result,
                            //such as forwarding, logging or dropping.
};
```

Define overall rule set as R0, in which rules are represented as r0, r1, . . . , and ri indicates the rule which has priority i (pri=i).

s102, define S0 as the initial search space, which contains all possible values of each filtering field in a packet header, and every field corresponds to a dimension of initial search space;

for 5-tupel classification, initial search space is
S0={([0,2$^{32}$−1], [0,2$^{32}$−1], [0,2$^{16}$−1], [0,2$^{16}$−1], [0,2$^{8}$−1]};

s103, generate the root node V0 corresponding to the R0, S0, and generate a group of processing elements R', S' and V'. Then copy R0, S0 and V0 to R', S' and V' respectively;

The purpose of introducing the concept of a 'node' is to construct the data structure of the decision tree by defining the node data structure.

s104, enqueue the group of processing elements R', S' and V' into queue Q, which is a FIFO queue, that is, the purpose of enqueue is to add a new item to the position at the back of the queue, the purpose of dequeue is to remove the item at the front of a non-empty queue;

s105, dequeue a group of processing elements from the queue Q, that is, dequeue the processing elements at the front, and obtain R', S', V' of the dequeued processing elements, in order to identify them, here, R', S', V' of the dequeued processing element are denoted as R, S, V respectively;

s106, decide whether each rule in R includes S, if so, which means that the node V doesn't need to be partitioned again, go to step s116, if not, which means that the node V needs to be further partitioned, go to step s107;

The definition of 'include' in the context of "space which includes rules" mentioned here and in the description of the present invention is specifically explained as follows:

"Include" relation for single dimension range: two intervals such as [a1, a2], [b1, b2], if a1<=b1 and a2>=b2, then [a1, a2] includes [b1, b2];

"Include" relation for multiple fields dimensional range: intervals on every dimension of the multi-dimensional object A includes corresponding intervals of the multi-dimensional object B, rules and search spaces in the embodiment are all multi-dimensional objects.

s107, select field F as the partition field for s, along which there are a maximum number of different endpoint values.

In this embodiment, at first, M is defined as a set which contains all the endpoint values (values of every starting point and ending point of every interval) of every rule in R on the same field f (for 5-tuple, 0<=f<5), where 1<M'<2(N+1). N is the number of all rules in R. M' endpoint values on every field are sorted in ascending order and stored in array Pt[i], where 0<i<M'+1, thus the step is to select the dimension corresponding to the field whose array stores the most endpoint values as the partition dimension for partitioning S.

s108, sort different endpoint values of all rules in R along the partition field F in the ascending order, and assume M endpoint values in total;

s109, select the endpoint value numbered/NT(M/2) along F as the partition point P, where INT (M/2) means the rounding operation;

s110, partition S into subspace S1 and subspace S2 through partition point P on F;

Spatial partition is defined as partitioning the current search space on a designated dimension. For example, if the initial search space is partitioned through partition point P on the first field, then, two search sub-spaces are obtained, i.e.
S1'={[0,P-1], [0,$2^{32}$-1], [0,$2^{16}$-1], [0,$2^{16}$-1], [0,$2^{8}$-1]},
S2'={[P,$2^{32}$-1], [0,$2^{32}$-1], [0,$2^{16}$-1], [0,$2^{16}$-1], [0,$2^{8}$-1]}.

s111, label all rules in rule set R which overlap with subspace S1 as rule set R1, and all rules in R which overlap with subspace S2 as rule set R2;

The definition of 'overlap' in the context 'rules overlap with space' mentioned in the embodiment and the description of the present invention is specifically explained as follows:

Overlapping relation for single dimensional range: two intervals such as [a1, a2], [b1, b2], if a1<=b2 and a2>=b1, then [a1, a2] is overlapped with [b1, b2];

Overlapping relation of multiple fields dimensional range: every dimensional range of the multi-dimensional object A is overlapped with corresponding dimensional range of the multi-dimensional object B, rules and search spaces of the embodiment are multi-dimensional objects, so overlapping between rules and spaces indicates the overlapping relations which meet the multiple fields dimensional range described above.

s112, generate two sub-nodes V1 and V2, store them in continuous memory space, and associate V1 with R1, S1, V2 with R2, S2. Since the memory address spaces of V1 and V2 are continuous memory space, V2 could be obtained from the address space of V1;

s113, set V as an internal node, and assign following data structure to V:
V.field=F, V.point=P, V.offset=starting address of V1, here, address is memory address value.

Thus, the node V's data structure of dequeued processing elements is constructed, and dichotomized into two new sub-nodes V1 and V2;

s114, generate a group of processing elements R', S' and V', copy R1, S1, and V1 to R', S' and V' respectively, and then enqueue the group into queue Q;

s115, generate a group of processing elements R', S' and V', copy R2, S2, and V2 to R', S' and V' respectively, enqueue the group into queue Q, and then return to step s105;

s116, obtain rule r with the highest priority in R, define V as a leaf node, and assign the following data structure to V:
V.field=r.action V.point=r.pri, V.offset=0;
Where r.action is the classification result of rule r, r.pri is the priority level of rule r;

Thus, the data structure of V in the dequeued processing element is constructed completely.

s117, decide whether queue Q is empty, if so, go to step s118, if not, go to step s105;

Only when the queue is empty does it indicate that the partition of all search spaces is finished and the construction of the decision tree is completed.

s118, return root node V0, which is the starting node to look up the decision tree data structure;

Decision tree traversal is completed through a root node which is the starting node to look up the decision tree data structures, so that the operation of returning the root node is equal to the operation of returning the classification data structure of the entire decision tree.

s119, receive a network packets, and according to the values of filtering fields, look up the decision tree from the root node V0, reach a leaf node, then classify the packet according to V.field stored in the leaf node.

Steps s101-s117 mentioned above are the process of construction of classification data structures, i.e. decision trees. Initial search space may be continuously partitioned after the above steps. If the initial search space is considered as root node V0 and partitioned continuously, sub-nodes could be obtained during the aforementioned process and the decision tree could then be constructed. The decision tree of the embodiment is a binary tree, in which every node corresponds to one search space (the root node corresponds to the initial search space), every internal node has two sub-nodes, and the search spaces corresponding to the sub-nodes are two sub-spaces partitioned through the internal node as a partition point. The data structure of node is as follows:

TREENODE{
Uint8_t  field:8 // internal node: field to be spatially divided
                 // leaf node: classification result of matched //rules
                 (action )

-continued

```
uint32_t    offset:24;   // internal node: offset of lower level node
                         //address.
                         // leaf node: 0
uint32_t    point;       // internal node: partition point
                         // leaf node: rule priority
};
```

During the construction, one processing element is dequeued at one time, r.pri, V.offset is assigned to V.field, V.point for data structure of node V in the processing element. Then if queue Q is empty, it means all of nodes are assigned with values of V.field, V.point=r.pri, V.offset among the decision tree. Based on the above data structure construction of the decision tree, the specific processes to classify received packets in step s119 are described as follows.

For 5-tuple packet, the following 5-tuple information may be obtained:
  32-bit source IP address: sIP;
  32-bit destination IP address: dIP;
  16-bit source port: sPT;
  16-bit destination port: dPT;
  8-bit transport layer protocol: prot.

The sub-steps of step s119 in the embodiment include:
  s119a, initialize the current node to be the root node V0;
  s119b, decide whether the V.offset of the current node is 0, if so, this indicates that the current node is a leaf node, go to step s119f, otherwise, the current node is an internal node, go to step s119c;
  s119c, dequeue the value of field in 5-tuple which corresponds to V.field in the current node, if the value is smaller than or equal to V.point, go to step s119d, otherwise go to step s119e;
  s119d, set sub-node V1 as the current node, and go to step s119b, where the memory address of node V1 is &(V)+V.offset, &(V) means the memory address of the current node, V.offset is the offset of the lower node address of the current node;
  s119e, set sub-node V2 as the current node, and return to step s119b, where the memory address of V2 is &(V)+V.offset+sizeof(V), &(V) means the memory address of the current node, V.offset is the offset of the lower node address of the current node, sizeof(V) means the memory size occupied by one node;
  s119f, obtain the classification result according to the value of V.field, obtain the rule priority according to the value of V.point, and then go to step s119g;
  s119g, perform the classification result, such as forwarding logging or dropping of the packet.

Embodiment 2

The steps of the present embodiment are the same as that of embodiment 1, except for the difference in the method for selecting partition point P on partition field F in step s109 for partitioning S.

The method to select partition point P on partition field F in the present embodiment is to select P from M endpoint values as the partition point such that after partitioning S through point P on field F, the number of rules that fall into one of the sub-spaces is closest to half of the number of all rules in R. That is, the endpoint value Pt[m] of the field F in R is selected as the partition point such that the number of rules that fall into a sub-space defined by [Pt[1], Pt[m]] can be equal to half of the number of all rules in R, i.e. INT(|R|/2), as far as possible, where |R| means the number of all rules in R, INT means the rounding operation.

The concept that the rule falls into the space mentioned in the embodiment and the description of the present invention is that rules overlap with space, where the definition for overlapping between rules and space is the same as described above:

overlapping relation for single dimensional range: two intervals such as [a1, a2], [b1, b2], if a1<=b2 and a2>=b1, then [a1, a2] is overlapped with [b1, b2];

overlapping relation for multiple fields dimensional range: every dimensional range in the multidimensional object A is overlapped with a corresponding dimensional range in the multidimensional object B, and rules and search spaces of the embodiment are multidimensional objects, so rules that fall into the spaces mean overlapping relations which fulfill the multiple fields dimensional range described above.

Embodiment 3

The steps of the present embodiment are the same as that of embodiment 1 and 2, except for a difference in the method to select partition point P on F in step s107~s109 for partitioning S.

As described above, collection M' is formed by different endpoint values (starting point values and end point values of every interval) of all rules in R of processing element on every same field f (for 5-tuple, 0<=f<5), in which 2<=M'<<2(N−1), N is the number of rules in R, then M' endpoint values of every field are sorted in the ascending order and stored in array Pt[i], in which 0<=i<M'. Each array Pt[i] mentioned above corresponds to each field, and for one array, two adjacent endpoints form an interval, thus M' endpoints form M'−1 intervals marked as Sr[j], where 0<=j<M'−1. The number of rules in R falling into each interval is marked as Sr[k], 0<=k<M'−1; here, that rules fall into every interval specifically means that rules fall into the sub-space constructed by defining the value on the corresponding field in S into the interval of adjacent endpoint values.

The method of selecting the partition dimension for internal node in the present embodiment is to count the number of rules that fall into every interval on the field of R, and to divide this number by the total number of intervals M'−1 on the field to get the number T of average rules per interval on every field, marked as follows:

$$T = \frac{1}{M'-1} \sum_{j=0}^{M'-2} Sr[j]$$

Select a partition dimension F such that T of the field is minimum, that is, select the dimension corresponding to the field with the minimum average number of rules per interval as partition dimension F.

The method of selecting partition point P on the partition dimension F is to select one endpoint value Pt[m] of field F as a partition point such that in is the minimum value which satisfies the following expression:

$$\sum_{j=0}^{m} Sr[j] > \frac{1}{2} \sum_{j=0}^{M'-2} Sr[j].$$

That is, p is the endpoint with minimum value which satisfies the following constraint condition: the sum of rules falling into the interval between the first endpoint and P on F is larger than half of the sum of the rules falling into each interval.

Currently specialized chips like ASIC/FPGA are used to solve performance bottleneck in packet classification in gigabit high-end routers. However, the disadvantages of a long time-to-market, large silicon area, high power consumption, and difficult upgrades result in a low performance/cost ratio for hardware solutions that further limits the extensive implementation of the aforementioned hardware. In contrast, the present invention can be implemented on many types of platforms, including general-purpose platforms based on microprocessor CPUs and specialized platform based on network processor NPUs, which ensures favorable performance and adaptive capability for different networks. Therefore, the whole software and hardware system can be provided to manufacturers as a core module of multiple fields packet classification, to increase the performance of packet classification devices based on a general-purpose processing platform, significantly reduces cost of the high-end routers and firewalls, thus accelerating the implementation and operation of the next generation Internet.

While the invention has been shown and described with respect to the embodiments, it should be understood that various changes and modifications may be made without departing from the scope of the invention as defined in the following claims.

The invention claimed is:

1. A method for multi-core processor based packet classification on multiple fields comprising the following steps:
   a) obtaining an overall rule set (R0), in which each rule includes a priority, a range value of each filtering field, and classification results;
   b) defining an initial search space (S0), which contains all possible values of each filtering field in a packet header in which each filtering field corresponds to a dimension of the initial search space;
   c) generating a root node (V0) corresponding to R0, S0, and a group of processing elements (R', S' and V');
   d) copying R0, S0 and V0 to R', S' and V' respectively;
   e) enqueueing the group of processing elements (R', S' and V') into a first in first out queue (Q);
   f) dequeueing another group of processing elements (R, S and V) from the queue Q;
   g) determining if each rule in R includes S;
   h) selecting a field (F) as a partition field for S, along which there are a maximum number of different endpoint values, if each rule in R does not include S;
   i) sorting the different endpoint values of all rules in R along the partition field F in ascending order, assuming there are M endpoint values in total;
   j) selecting an endpoint numbered INT(M/2) along F as a partition point P, where INT(M/2) is a rounding operation;
   k) partitioning S into a first subspace (S1) and a second subspace (S2) through the partition point P on F;
   l) labeling all rules in the rule set R which overlap with the subspace S1 as a rule set (R1);
   m) labeling all rules in the rule set R which overlap with the subspace S2 as a rule set (R2);
   n) generating two sub-nodes (V1 and V2);
   o) storing the sub-nodes V1 and V2 in a continuous memory space;
   p) associating V1 with R1 and S1;
   q) associating V2 with R2 and S2;
   r) setting an internal node (V);
   s) assigning the following data structure to V:
      V.field=F, V.point=P, V.offset=starting address of V1;
   t) generating another group of processing elements (R', S' and V');
   u) copying R1, S1 and V1 to R', S' and V';
   v) enqueueing the another group into the queue Q;
   w) generating another group of processing elements (R', S' and V');
   x) copying R2, S2 and V2 to R', S' and V';
   y) enqueueing the another group into the queue Q, and then returning to step (f);
   z) repeating steps (f)-(y) until each rule in R includes S;
   aa) obtaining a rule (r) with the highest priority in R;
   ab) defining a leaf node (V);
   ac) assigning the following data structure to V:
      V.field=r.action, V.point=r.pri, V.offset=0;
   Where r.action is the classification result of the rule r and r.pri is the priority of rule r;
   ad) determining if the queue Q is empty;
   ae) repeating steps (f), (g), and (z) until the queue Q is empty;
   af) returning the root node V0 if the queue Q is empty, which is a starting node used to map a decision tree data structure;
   ag) receiving a network packet;
   ah) mapping the decision tree from the root node V0 until a leaf node is reached, according to the values of the filtering fields; and
   ai) classifying the network packet according to V.field stored in the leaf node.

2. The method of claim 1, further comprising the following steps:
   a) initializing the current node to be the root node V0;
   b) determining if V.offset of the current node is 0;
   c) obtaining the value of V.field in the packet header if V.offset of the current node is not 0;
   d) determining if the value of V.field is smaller than or equal to V.point;
   e) setting sub-node V1 as the current node if the value of V.field is smaller than or equal to V.point;
   f) setting sub-node V2 as the current node if the value of V.field is not smaller than or equal to V.point;
   g) repeating steps (b)-(f) until V.offset of the current node is 0;
   h) obtaining the classification result according to the value of V.field if V.offset of the current node is 0;
   i) obtaining the rule priority according to the value of V.point; and
   j) performing the classification result.

3. The method of claim 2, further comprising:
   allocating the sub-node V1 according to V.offset of the current node before updating, the sub-node V1 having a storage address of: &(V)+V.offset, where &(V) denotes the storage address of the current node before updating; and
   allocating the sub-node V2 according to V.offset of the current node before updating, the sub-node V2 having a storage address of: &(V)+V.offset+sizeof(V), where &(V) denotes the storage address of the current node before updating and sizeof(V) denotes an address range occupied by one node.

4. The method of claim 1, further comprising the following steps:
   a) initializing the current node to be the root node V0;
   b) determining if V.offset of the current node is 0;
   c) obtaining the value of V.field in the packet header if V.offset of the current node is not 0;

d) determining if the value of V.field is smaller than or equal to V.point;
e) setting sub-node V1 as the current node if the value of V.field is smaller than or equal to V.point;
f) setting sub-node V2 as the current node if the value of V.field is not smaller than or equal to V.point;
g) repeating steps (b)-(f) until V.offset of the current node is 0;
h) obtaining the classification result according to the value of V.field if V.offset of the current node is 0;
i) obtaining the rule priority according to the value of V.point; and
j) performing the classification result.

5. The method of claim 4, further comprising:
allocating the sub-node V1 according to V.offset of the current node before updating, the sub-node V1 having a storage address of: &(V)+V.offset, where &(V) denotes the storage address of the current node before updating; and
allocating the sub-node V2 according to V.offset of the current node before updating, the sub-node V2 having a storage address of: &(V)+V.offset+sizeof(V), where &(V) denotes the storage address of the current node before updating and sizeof(V) denotes an address range occupied by one node.

6. A method for multi-core processor based packet classification on multiple fields comprising the following steps:
a) obtaining an overall rule set (R0), in which each rule includes a priority, a range value of each filtering field, and classification results;
b) defining an initial search space (S0), which contains all possible values of each filtering field in a packet header, in which each filtering field corresponds to a dimension of the initial search space;
c) generating a root node (V0) corresponding to R0, S0, and a group of processing elements (R', S' and V');
d) copying R0, S0 and V0 to R', S' and V' respectively;
e) enqueueing the group of processing elements (R', S' and V') into a first in first out queue (Q);
f) dequeueing another group of processing elements (R, S and V) from the queue Q;
g) determining if each rule in R includes S;
h) selecting a field (F) as a partition field for S, along which there a maximum number of different endpoint values;
i) sorting the different endpoint values of all rules in R along the partition field F in ascending order, assuming there are M endpoint values in total;
j) selecting an endpoint (P) from M endpoints as a partition point, such that after partitioning S through point P on field F, the number of rules that fall into a sub-spaces is closest to half of the number of all rules in R;
k) partitioning S into a first subspace (S1) and a second subspace (S2) through the partition point P on F;
l) labeling all rules in the rule set R which overlap with the subspace S1 as a rule set (R1);
m) labeling all rules in the rule set R which overlap with the subspace S2 as a rule set (R2);
n) generating two sub-nodes (V1 and V2);
o) storing the sub-nodes V1 and V2 in a continuous memory space;
p) associating V1 with R1 and S1;
q) associating V2 with R2 and S2;
r) setting an internal node (V);
s) assigning the following data structure to V:
V.field=F, V.point=P, V.offset=starting address of V1;
t) generating another group of processing elements (R' S' and V');

u) copying R1, S1 and V1 to R', S' and V';
v) enqueueing the another group into the queue Q;
w) generating another group of processing elements (R', S' and V');
x) copying R2, S2 and V2 to R', S' and V';
y) enqueueing the another group into the queue Q, and then returning to step (f);
z) repeating steps (f)-(y) until each rule in R includes S;
aa) obtaining a rule (r) with the highest priority in R;
ab) defining a leaf node (V);
ac) assigning the following data structure to V:
V.field=r.action, V.point=r.pri, V.offset=0;
Where r.action is the classification result of the rule and r.pri is the priority of rule r;
ad) determining if the queue Q is empty;
ae) repeating steps (f), (g), and (z) until the queue Q is empty;
af) returning the root node V0 if the queue Q is empty, which is a starting node used to map a decision tree data structure;
ag) receiving a network packet;
ah) mapping the decision tree from the root node V0 until a leaf node is reached, according to the values of the filtering fields; and
ai) classifying the network packet according to V.field stored in the leaf node.

7. The method of claim 6, further comprising the following steps:
a) initializing the current node to be the root node V0;
b) determining if V.offset of the current node is 0;
c) obtaining the value of V.field in the packet header if the V.offset of the current node is not 0;
d) determining if the value of V.field is smaller than or equal to V.point;
e) setting sub-node V1 as the current node if the value of V.field is smaller than or equal to V.point;
f) setting sub-node V2 as the current node if the value of V.field is not smaller than or equal to V.point;
g) repeating steps (b)-(f) until the value of V.offset of current node is 0;
h) obtaining the classification result according to the value of V.field if V.offset of the current node is 0;
i) obtaining the rule priority according to the value of V.point;
j) performing the classification result.

8. The method of claim 7, further comprising:
allocating the sub-node V1 according to V.offset of the current node before updating, the sub-node V1 having a storage address of: &(V)+V.offset, where &(V) denotes the storage address of the current node before updating; and
allocating the sub-node V2 according to V.offset of the current node before updating, the sub-node V2 having a storage address of: &(V)+V.offset+sizeof(V), where &(V) denotes the storage address of the current node before updating and sizeof(V) denotes an address range occupied by one node.

9. A method for multi-core processor based packet classification on multiple fields comprising the following steps:
a) obtaining an overall rule set (R0), in which each rule includes a priority, a range value of each filtering field, and classification results;
b) defining an initial search space (S0), which contains all possible values of each filtering field in a packet header, in which each filtering field corresponds to a dimension of the initial search space;

c) generating a root node (V0) corresponding to R0, S0, and a group of processing elements (R', S' and V');
d) copying R0, S0 and V0 to R', S' and V' respectively;
e) enqueueing the group of processing elements (R', S' and V') into a first in first out queue (Q);
f) dequeueing another group of processing elements (R, S and V) from the queue Q;
g) determining if each rule in R includes S;
h) counting the number of rules in R that fall into each interval for all fields, where every two adjacent endpoint values on each field of R form an interval;
i) computing an average number of rules per interval for each field;
j) selecting a field (F) with a minimum average number of rules per interval as a partition field for S?;
k) selecting an endpoint (P) on the field F as a partition point, such that a sum of rules falling into an interval between a first endpoint and P on F is a minimum number, where the minimum number is larger than half of the sum of rules falling into each interval;
l) partitioning S into a first subspace (S1) and a second subspace (S2) through the partition point P on F;
m) labeling all rules in the rule set R which overlap with the subspace S1 as a rule set (R1);
n) labeling all rules in the rule set R which overlap with the subspace S2 as a rule set (R2);
o) generating two sub-nodes (V1 and V2);
p) storing the sub-nodes V1 and V2 in a continuous memory space;
q) associating V1 with R1 and S1;
r) associating V2 with R2 and S2;
s) setting an internal node (V);
t) assigning the following data structure to V:
V.field=F, V.point=P, V.offset=starting address of V1;
u) generating another group of processing elements (R', S' and V');
v) copying R1, S1 and V1 to R', S' and V';
w) enqueueing the another group into queue Q;
x) generating another group of processing elements (R', S' and V');
y) copying R2, S2 and V2 to R', S' and V';
z) enqueueing the another group into queue Q, and then returning to step f;
aa) repeating steps (f)-(z) until each rule in R includes S;
ab) obtaining a rule (r) with the highest priority in R;
ac) defining a leaf node (V);
ad) assigning the following data structure to V:
V.field=r.action, V.point=r.pri, V.offset=0;
Where r.action is the classification result of the rule r, and r.pri is the priority of rule r;
ae) determining if the queue Q is empty;
af) repeating steps (f), (g) and (aa) until the queue Q is empty;
ag) returning the root node V0 if the queue Q is empty, which is a starting node used to map a decision tree data structure;
ah) receiving a network packet;
ai) mapping the decision tree from the root node V0 until a leaf node is reached, according to the values of the filtering fields; and
aj) classifying the network packet according to V.field stored in the leaf node.

* * * * *